United States Patent Office 3,142,674
Patented July 28, 1964

3,142,674
RING A UNSATURATED 11β,12β-OXIDO-STEROID-3-ONES OF THE PREGNANE SERIES
Norman L. Wendler, Summit, and David Taub, Metuchen, N.J., assignors to Merck & Co., Inc., Rahway, N.J., a corporation of New Jersey
No Drawing. Original application Jan. 25, 1956, Ser. No. 561,366. Divided and this application Mar. 26, 1957, Ser. No. 648,492
4 Claims. (Cl. 260—239.55)

This application relates to steroids and particularly to 12α-halo compounds of the pregnane series, to processes for preparing these compounds and to intermediate compounds thus obtained.

This application is a division of our copending application Serial No. 561,366, filed January 25, 1956.

The compounds which are the subject of the invention are 12α-halo compounds having the following general formula:

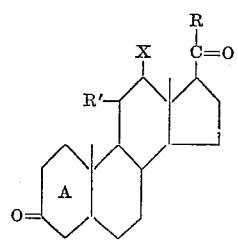

which are unsaturated in the A ring wherein R is
—CH$_2$OH

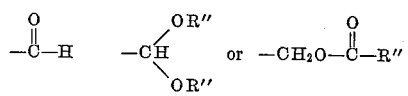

R″ is hydrogen or a hydrocarbon group such as an alkyl, aralkyl or aryl group containing less than eleven carbon atoms and R′ is hydroxy or a keto group and X is a chloro or a fluoro group. These compounds may be more specifically described as 3-keto-1-pregnenes, 3-keto-4-pregnenes and 3-keto-1,4-pregnadienes. These compounds have cortisone-like activity equivalent locally and systemically to the activity of the corresponding 9α-halo compound with a reduction in the occurrence of undesirable side effects. The compounds of the invention, therefore, can be compounded and used in a manner similar to cortisone.

According to one specific embodiment of the invention, the 12α-halo-pregnene compounds are prepared by reacting a 21-acylate of 12α-bromo-4-pregnen-21-ol-3,11,20-trione (Compound I) with a nitrogenous ketone reagent to protect the 3 and 20 keto groups thereby forming the corresponding disemicarbazide or the like compound (Compound II), reducing this compound to form the corresponding 11,21-dihydroxy compound (Compound III), hydrolyzing the latter compound to form 12α-bromo-4-pregnene-11β,21-diol-3,20-dione (Compound IV), reacting the compound with a base to produce the corresponding 11β,12β-oxido compound (Compound V), acylating this compound to produce the corresponding 21-acylate thereof (Compound VI), reacting the 21-acylate thus formed with hydrochloride acid or hydrofluoric acid to produce the corresponding 21-acylate of 12α-chloro-4-pregnene-11β,21-diol-3,20-dione or 12α-fluoro-4-pregnene-11β,21diol-3,20-dione (Compound VII). The latter compounds can be oxidized to produce the corresponding 11-keto compounds (Compound VIII). The two latter compounds can be saponified to produce the corresponding 21-hydroxy compounds (Compounds IX and X) which can be oxidized with cupric acetate to form the corresponding 21-aldehydes (Compounds XI and XII) which can be recovered as the aldehyde or dialkoxy or diacyloxy derivatives (Compounds XIII and XIV). This process can be chemically represented, as follows:

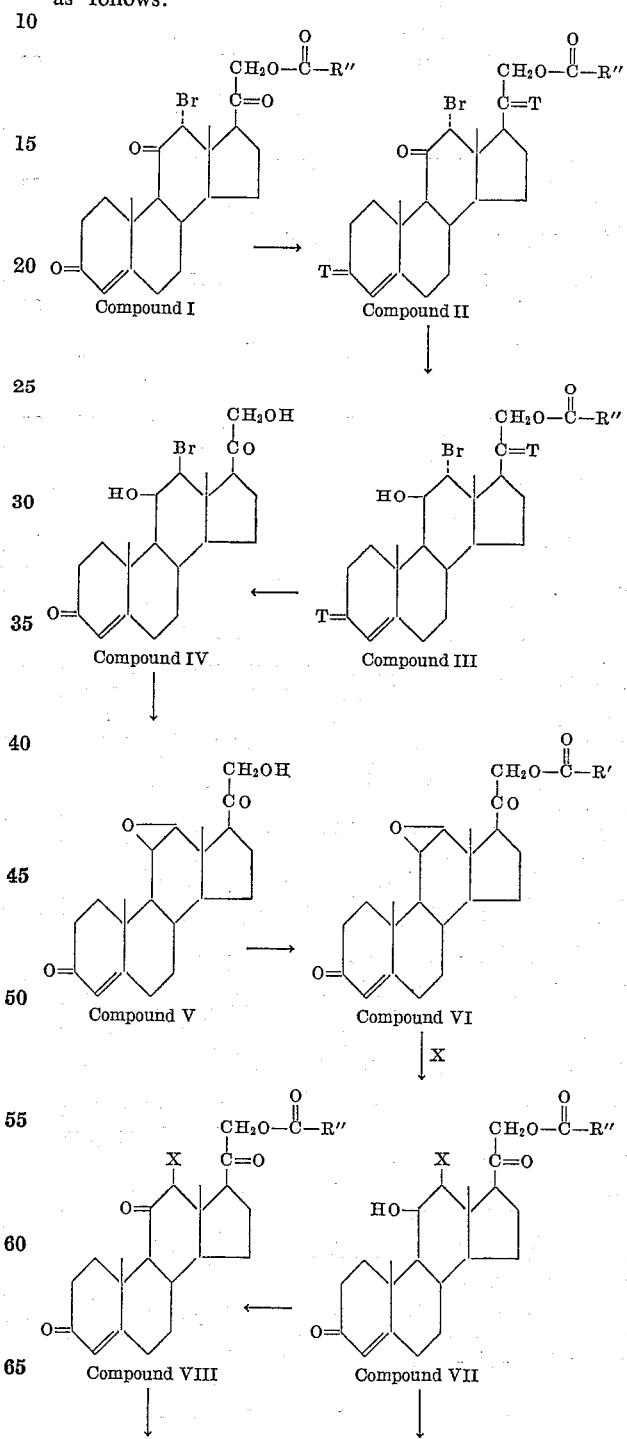

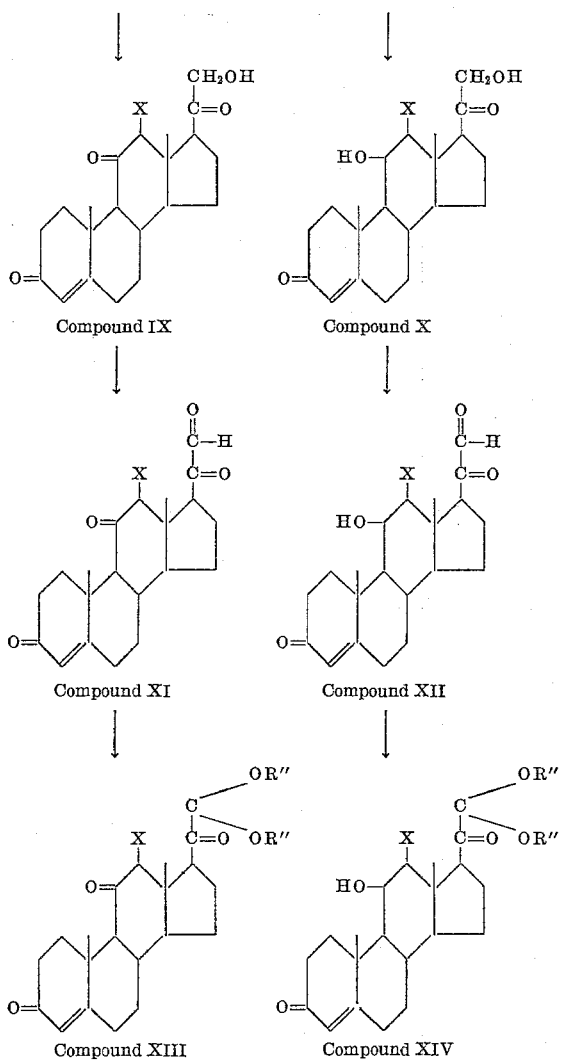

Compound IX  Compound X
Compound XI  Compound XII
Compound XIII  Compound XIV

The 21-acylate of 12α-bromo-4-pregnen-21-ol-3,11,20-trione is reacted with a ketone reagent to form the ketone derivative wherein both the 3 and 20 keto groups are replaced. The ketone reagent is any of the reagents which will react with a keto group to form a group which can be readily hydrolzed to reform the keto groups. Typical examples of classes of such reagents are hydroxylamines, semicarbazides, thiosemicarbazides, arylhydrazines and the like. The most common of these reagents are semicarbazide, hydrazine, thiosemicarbazide, hydroxylamine, ethylphenylhydrazine, and methylhydroxylamine.

The reaction is carried out at a pH of from 3.0 to 6.0 and preferably in an inert solvent. The pH of the reaction being the actual observed pH of a sample of the reaction mixture diluted with an equal volume of water. If desired, the reaction can be effected in an inert solvent, such as benzene, toluene, tetrahydrofuran, dioxane, dimethylformamide and dimethylacetamide. The reaction is conveniently achieved by intimately contacting the reactants and heating the mixture at an elevated temperature such as the reflux temperature of the solvent, for about one to five hours. The product can be recovered by the addition of an immiscible solvent. Typical examples of the ketone derivatives which can be prepared in this manner are 3,20-disemicarbazone of 12α-bromo-4-pregnen-21-ol-3,11,20-trione 21-acetate; 3,20 - dioxime of 12α-bromo - 4 - pregnen-21-ol-3,11,20-trione 21-propionate; 3,20 - bis - (2,4 - dinitrophenylhydrazone) of 12α-bromo-4-pregnen-21-ol-3,11,20-trione 21 - butyrate; 3,20-dithiosemicarbazone of 12α - bromo - 4 - pregnen-21-ol-3,11-20-trione 21 - tertiary butylacetate; 3,20 - disemicarbazone of 12α-bromo-4-pregnen-21-ol-3,11,20-trione 21-p-aminobenzoate; 3,20-disemicarbazone of 12α-bromo-4-pregnen-21-ol-3,11,20-trione 21-hydrocinnamate and 3,20-disemicarbazone of 12α-bromo-4-pregnen-21-ol-3,11,20-trione 20-hemisuccinate.

The 3,20-diketone reagent derivative of the 21-acylate of 12α-bromo-4-pregnen-21-ol-3,11,20-trione is reduced to produce the corresponding 11-hydroxy compound. This reduction is preferably carried out by reaction with an alkali metal borohydride. The reaction can be carried out in a solvent such as water, methanol, ethanol, tetrahydrofuran and the like and mixtures thereof. The temperature of the reaction may vary from about 0 to 100° C., but it is preferably carried out at about approximately room temperature (20 to 30° C.). The reaction is usually complete in a few hours, although longer and shorter periods can be used. The alkali metal borohydride which is preferably used in excess of the equivalent amount is a boron compound having alkali metal associated with a group consisting of a boron atom having at least one and up to four hydrogen atoms, when there are less than four hydrogen atoms the group containing the boron atom can contain one to three atoms other than hydrogen or one to three radicals, which atoms or radicals are relatively inert and non-reactive with respect to the reducing agent characteristic of the hydrogen atoms of these compounds or a combination of such atoms other than hydrogen and radicals so long as at least one hydrogen atom is present, and so long as the total number of atoms including hydrogen is four. Typical examples of such compounds are sodium borohydride, lithium borohydride, sodium triethyl borohydride, potassium triethyl borohydride and potassium borohydride. The product can be readily recovered by neutralizing the unreacted reagent and diluting with water and evaporating the solvent under vacuum.

The 3,20-diketone reagent derivative of the 21-acylate of 12α-bromo-4-pregnene-11β,21-diol-3,20-dione is hydrolyzed to produce 12α-bromo-4-pregnene-11β,21-diol-3,20-dione. The preferred hydrolyzing agent is a mixture of acetic acid and pyruvic acid. The reaction can be carried out at about 20 to 100° C., but it is preferably carried out at about room temperature. With the preferred reactions, at the preferred temperature, the reaction is usually complete in about ten to twenty hours.

The 12α-bromo-4-pregnene-11β,21-diol-3,20-dione is converted to 11β,12β-oxido-4-pregnen-21-ol-3,20-dione by reacting with a dehydrobrominating base. Any organic or inorganic base which will not adversely effect other groups of the steroid molecule can be employed in the reaction. In particular alkali metal and alkaline earth metal salts and/or alcoholates such as potassium acetate, sodium propionate, sodium bicarbonate and barium methoxide, sodium t-butoxide, potassium ethoxide, sodium hydroxide, potassium hydroxide, tetraethyl ammonium hydroxide, calcium isopropionate, magnesium methoxide, magnesium hydroxide, barium hydroxide, sodium carbonate, potassium carbonate, lithium carbonate and barium ethoxide can be used for the dehydrobromination. This reaction is ordinarily achieved in the presence of a liquid reaction medium such as substantially anhydrous organic solvents. Some of the solvents which can be used are the lower alcohols, lower ketones, and aromatic hydrocarbons. Typical examples of these solvents are methanol, ethanol, propanol, butanol, acetone, methyl ethyl ketone, diethyl ketone and ethyl propyl ketone. Temperatures of from 0 to 40° C. can be used for effecting the reaction, although elevated temperatures such as the reflux temperature are preferred with the weaker bases, such as potassium acetate. A reaction time of a few minutes to three hours is generally sufficient to complete the reaction. Recovery of the product from the reaction mixture is conveniently effected by conventional methods, such as evaporating the mixture and crystallizing the product with water or by extraction with a suitable solvent.

The 11β,12β-oxido-4-pregnen-21-ol-3,20-dione is reacted with an acylating agent to produce the corresponding 21-acylate. Suitable acylating agents are acid halides such as acid chloride, acid anhydride and the like. It is preferred to use the acid anhydrides in the presence of a tertiary amine with pyridine being preferred. The acylating agent containing the acyl residue of an organic carboxylic acid are preferably those containing from one to eleven carbon atoms inclusive; among such acids are formic, acetic, propionic, butyric, t-butylacetic, valeric, hexanoic, heptanoic, octanoic, cyclopentanecarboxylic, cyclopentylpropionic, benzoic, toluic, oxalic and the like. The acids can also contain substituents such as halogen, alkyl, alkoxy and others which are non-reactive under the reaction conditions employed. It is usually preferred to use an excess of acylating agent. It is sometimes desirable to add a small amount of acid catalyst, such as sulfuric acid, sulfonic acid and the like with para-toluene sulfonic acid being preferred. The reaction is usually carried out at about 20 to 30° C. although temperatures of 0 to 100° C., as well as lower or higher temperatures are operative. A reaction time of about 15 minutes to four hours is usually satisfactory. It is sometimes desirable to carry out the reaction in a solvent to control the medium temperature, while heating the reaction mixture, especially if the acylating agent has a high boiling point. Suitable solvents are benzene, toluene, xylene, paraffin hydrocarbons, cycloparaffin hydrocarbons and the like. The 21-acylate of 11β,12β-oxido-4-pregnen-21-ol-3,20-dione can be recovered in any conventional manner, for example, if most of the excess acylating agent has been removed during the reaction the last traces may be removed during vacuum, the residue dissolved in an organic solvent such as ether, benzene, chloroform and the like, the resulting solution washed with an aqueous basic solution such as aqueous sodium bicarbonate, sodium carbonate, sodium hydroxide and the like, the washed solution dried by a drying agent, such as sodium sulfate, the dried solution filtered to remove the drying agent, the solvent distilled and the residue crystallized from a suitable solvent such as ethanol. Alternately, if the excess acylating agent has not been removed the reaction mixture can be stirred with water or a basic solution such as aqueous sodium bicarbonate solution to decompose the excess acylating agent, then as described for the above method, the resulting mixture extracted with an organic solvent, the organic solvent washed with a basic solution and the product isolated from the washed organic solution. Typical of the 21-acylates prepared in this manner are the acetate, propionate, butyrate, tertiarybutyl acetate, trimethylacetate, benzoate, phenyl acetate, para-amino-benzoate, hydrocinnamate, hemisuccinamate and β,β-dimethyl hemiglutarate.

The 21-acylate of 11β,12β-oxido-4-pregnen-21-ol-3,20-dione is reacted with a source of hydrogen chloride or hydrogen fluoride to produce the corresponding acylate of 12α-halo-4-pregnene-11β,21-diol-3,20-dione. Contact between the reactants can be effected in the presence of an inert organic solvent. The preferred solvents are halogenated hydrocarbons such as chloroform, but other solvents can be used such as tetrahydrofuran, benzene, xylene or the like. The reaction can also be carried out in the two-phase system by using mixtures of water and chloroform or other organic solvents as the reaction medium. The reaction with the source of hydrogen fluoride such as hydrofluoric acid is usually effected at a reduced temperature of about −10° C. and preferably at approximately 0° C. The hydrochlorination goes to completion in a matter of minutes and after the reaction is completed, the product can be isolated by diluting the mixture with water, separating the organic extract and evaporating to dryness. The hydrofluorination is carried out in essentially the same manner as the hydrochlorination, except that it is preferred to employ an excess of hydrofluoric acid. In addition, substantially anhydrous conditions are the most desirable to produce the highest yield of product although aqueous conditions can be used. A reaction time of approximately two to four hours is usually required to complete the reaction.

The 21-acylate of 12α-acylate of 12α-chloro or 12α-fluoro-4-pregnene-11β,21-diol-3,20-dione is oxidized to produce the corresponding 11-keto compound. Any suitable oxidizing agent can be employed to effect the conversion. It is usually preferred, however, to employ chromium trioxide and glacial acetic acid or sodium dichromate as the oxidizing agent. The reaction is usually completed in a reasonably short time at room temperature, e.g., from one to two hours usually being adequate. The product can be readily recovered from the reaction mixture by standard isolation techniques.

The 21-acylate of 12α-chloro-4-pregnene-11β,21-diol-3,20-dione; 12α-fluoro-4-pregnene-11β,21-diol-3,20-dione; 12α-chloro-4-pregnen-21-ol-3,11,20-trione and 12α-fluoro-4-pregnen-21-ol-3,11,20-trione can be hydrolyzed to the free alcohols by reacting with an alkali metal or alkaline metal or alkaline earth metal base in the presence of an aqueous organic solvent such as aqueous lower alcohol. The hydrolysis can be conveniently effected by heating the mixture to an elevated temperature preferably the reflux temperature for about ten minutes to one hour. The product can be isolated by evaporating the organic solvent, extracting the aqueous solution with an immiscible organic solvent and concentrating the organic solvent to dryness.

The 12α-fluoro and 12α-chloro-4-pregnene-11β,21-diol-3,20-dione and 12α-fluoro and 12α-chloro-4-pregnen-21-ol-3,11,20-trione is reacted with cupric acetate to produce the corresponding 21-aldehyde derivatives. This reaction is preferably effected by reacting about two equivalents of cupric acetate with one equivalent of the pregnene. The use of a slight excess of cupric acetate, such as 2.1 to 2.2 equivalents thereof, serves to produce the best yields of the aldehyde. The reaction is most conveniently achieved by intimately contacting the steroid and cupric acetate in a suitable solvent such as water or a polar organic solvent. Examples of suitable polar organic solvents for this purpose are the lower alcohols, acetone, dioxane, tetrahydrofuran, and dimethoxyethane. Generally, it is found that maximum yields of the aldehyde is obtained under optimum conditions by effecting the reaction at an acid pH. This is accomplished by adding a minor amount of an acid such as acetic acid to the reaction mixture.

The reaction proceeds slowly at normal temperatures but may be more quickly accomplished at elevated temperatures, preferably reflux temperatures of the solvent mixture. At the reflux temperature the reaction is usually complete within an hour. After the reaction has been completed, the aldehyde can be readily separated from the reaction mixture by conventional methods. One such typical separation method comprises filtering the reaction mixture to remove cuprous oxide and adding water to the filtrate to precipitate the product. The aldehyde is ordinarily recovered as a hydrate from aqueous solutions but yield the free aldehydes after drying under suitable conditions.

The acetal derivative (21,21-dialkoxy-derivative) of the 21-aldehydes are prepared by reacting the aldehyde or hydrate with an alcohol in the presence of a trace of mineral acid, such as sulfuric acid or hydrochloric acid. The alcohol has the formula $R^2OH$ wherein $R^2$ is an alkyl group and preferably having from one to eight carbon atoms. Typical examples of suitable alcohols are methanol, ethanol, 1-propanol, 1-butanol, 2-methyl-1-propanol, 2-butanol, 1-pentanol, 1-hexanol, benzyl alcohol and phenylethyl alcohol. The reaction proceeds rapidly, at room temperature, and the product may be recovered by the addition of a miscible solvent in which the acetal is insoluble. Examples of compounds which can be prepared in this manner are as follows:

21,21-dimethoxy-12α-fluoro-4-pregnene-11β,21,21-triol-3,20-dione;
21,21-dimethoxy-12α-fluoro-4-pregnene-21,21-diol-3,11,20-trione;
21,21-dimethoxy-12α-chloro-4-pregnene-11β,21,21-triol-3,20-dione;
21,21-dimethoxy-12α-chloro-4-pregnene-21,21-diol-3,11,20-trione;
21,21-dimethoxy-12α-fluoro-1,4-pregnadiene-11β,21,21-triol-3,20-dione;
21,21-dimethoxy-12α-chloro-1,4-pregnadiene-11β,21,21-triol-3,20-dione;
21,21-dimehoxy-12α-chloro-1,4-pregnadiene-21,21-diol-3,11,20-trione and similar compounds wherein the 21,21-dimethoxy group is rejlaced by 21,21-diethoxy; 21,21-dibutoxy; 21,21 - dipropionoxy; di(2 - methylpropionoxy) - 21,21; 21,21-dipentoxy; and 21,21-dibenzyloxy.

The diacylated derivatives (21,21-diacyloxy derivatives) of the 21-aldehydes are prepared by reacting the aldehydes, and hydrates thereof with an acylating agent. Suitable acylating agents are acid halides, such as the acid chlorides, acid anhydrides, and others with the acid anhydrides being preferred, the acylating agent containing the acyl residue of an organic carboxylic acid, especially those containing from one to eight carbon atoms, inclusive. Among such acids are formic, acetic, propionic, butyric, valeric, hexanoic, heptanoic, octanoic, cyclopentancarboxylic, cyclopentylpropionic, benzoic, toluic, oxalic and the like. Usually a large excess of the acylating agent is used. However, any quantity from about the theoretical amount to about 500 times this amount, or even more, is operative with an excess of about two to about ten times the theoretical amount being preferred. The acylation may be effected in a solvent, such as tertiary amines, ether, chlorinated hydrocarbons or hydrocarbons. Typical examples of such solvents are chloroform, pyridine, benzene and toluene. A reaction period of about one to twenty hours is satisfactory, with a period of about ten to sixteen hours being preferred.

The acylated crude reaction mixture can be isolated in any convenient manner, for example, if most of the excess acylating agent has been removed during the reaction, the last traces may be removed under vacuum, the residue dissolved in an organic solvent, such as ether, chloroform, and the like, and the resulting solution washed with an aqueous basic solution, such as aqueous sodium bicarbonate, sodium carbonate, sodium hydroxide, and the like, the washed solution dried by a drying agent, such as sodium sulfate, the dried solution filtered to remove the drying agent, the solvent distilled, and the residue crystallized from a suitable solvent, such as benzene. Alternately, if the excess acylating agent has not been removed, the reaction mixture can be stirred with water or a basic solution, such as aqueous sodium bicarbonate solution to decompose the excess acylating agent, then, as described for the first method, the resulting mixture extracted with an organic solvent, the organic solution washed with a basic solution, and the product isolated from the washed organic solution.

According to an embodiment of the invention, novel compositions for use in the treatment of appropriate diseases are produced, in which the active ingredient is a 12α-halo compound. These compositions comprise at least one of the active compounds intimately united with a suitable carrier which can be either a liquid or a solid. The resulting compositions can be powders, tablets, capsules or other dosage forms, as required. Liquid diluents, such as sterile water or oils, can be used to prepare compositions suitable for parenteral injection. In addition to the active ingredient and water, such compositions can contain suspending agents, such as sodium carboxymethylcellulose, methyl cellulose, gelatin and various solubilizing or dispersing agents, such as lecithin. Solid preparations suitable for topical and oral administration can be produced by dispersing the active ingredient in a solid carrier, such as starch, sugar or talc and the like. The resulting composition can be used in powder form, or it may be used to fill capsules. In addition, such solid compositions can be produced in tablet form by the application of well-known techniques. The concentration of active ingredients in such compositions, whether liquid or solid, can be adjusted to suit any intended purpose.

The following examples are given for purposes of illustration:

EXAMPLE 1

*3,20-Bis Semicarbazone of 12α-Bromo-4-Pregnen-21-Ol-3,11,20-Trione 21-Acetate*

A mixture was prepared of 12α-bromo-4-pregnen-21-ol-3,11,20-trione 21-acetate (11.54 grams), methanol (240 ml.) and dimethylformamide (60 ml.) in a one liter flask. The air in the flask was displaced by nitrogen and a slurry of semicarbazide hydrochloride (13.06 grams) and sodium bicarbonate (74 grams) in 15 ml. of water was added. The mixture was then refluxed for three and one-half hours and kept at 45° C. for an additional 18 hours. The mixture was then cooled to room temperature and 1,000 ml. of 50% saturated salt-water solution was added with stirring. The product separated as a powdery solid and was filtered, washed with water until chloride free and dried in vacuo at 80° C. Micro melting point begins to darken at 200° C. and blackens at 300° C. with no observed melting.

EXAMPLE 2

*3,20-Bis Semicarbazone of 12α-Bromo-4-Pregnene-11β,21-Diol-3,20-Dione 21-Acetate*

A 290 mg. sample of a compound prepared in Example 1 was mixed with 50 ml. of dry tetrahydrofuran. The mixture was stirred at 25° C. and over a one-hour period 100 mg. of lithium borohydride in 10 ml. tetrahydrofuran were added. The mixture was stirred for an additional hour and then cooled to 0° C. A mixture of 2 ml. of acetic acid and 20 ml. of water were slowly added to decompose the unreacted reagent. The mixture was then concentrated in vacuo to small volume and 100 ml. of water were added. The white powdery precipitate which was formed was filtered and washed with water and then air-dried.

EXAMPLE 3

*12α-Bromo-4-Pregnene-11β,21-Diol-3,20-Dione*

A 190 ml. sample of the product produced in Example 2 was mixed with 3 ml. of acetic acid, 1.2 ml. of water and 0.5 ml. of pyruvic acid. The mixture was kept at 25° C. for a period of twenty hours. The mixture was then concentrated to small volume, extracted with chloroform and then washed with water and a mixture of water and potassium bicarbonate and then dried over magnesium sulfate to produce 150 mg. of crude product.

EXAMPLE 4

*11β,12β-Oxido-4-Pregnen-21-Ol-3,20-Dione*

A 140 mg. sample of 12α-bromo-4-pregnene-11β,21-diol-3,20-dione was mixed with 70 mg. of potassium hydroxide in 5 ml. of methanol while maintaining the mixture under an atmosphere of nitrogen. The yellow solution which formed was kept at 25° C. for one-half hour and concentrated to a small volume. Water was then added and the organic material extracted with ethyl acetate to yield 11β,12β-oxido-4-pregnen-21-ol-3,20-dione.

EXAMPLE 5

21-Acetate of 11β,12β-Oxido-4-Pregnen-21-Ol-3,20-Dione

A 111 mg. sample of 11β,12β-oxido-4-pregnen-21-ol-3,20-dione was acylated with 1 ml. of pyridine and 1 ml. of acetic anhydride for 18 hours at room temperature. The product was chromatographed and recrystallized to yield the 21-acetate of 11β,12β-oxido-4-pregnen-21-ol-3,20-dione. The product had a melting point of 172 to 173° C.

EXAMPLE 6

21-Acetate of 12α-Fluoro-4-Pregnene-11β,21-Diol-3,20-Dione

A solution of the 21-acetate of 11β,12β-oxido-4-pregnen-21-ol-3,20-dione (600 mg.) in 6 ml. of chloroform and 6.6 ml. of tetrahydrofuran was cooled to −65° C. and added dropwise to 6.0 ml. of a mixture of liquid hydrogen fluoride and tetrahydrofuran (2:1 by weight) at −65° C. Three ml. of chloroform which was cooled to −60° C. was used to wash in the last traces of steroid. The mixture was kept at −5° C. for two hours. It was then cooled to −65° C. and added slowly with stirring to a mixture of ten grams of potassium carbonate, 50 ml. of water and 50 ml. of chloroform maintained at 0° C. The layers were separated, the aqueous wash extracted further with chloroform, the combined chloroform extract washed twice with water and dried with magnesium sulfate. The residue was treated with a mixture of 2 ml. of pyridine and 1.5 ml. of acetic anhydride at 25° C. for 18 hours. Water and chloroform were then added, the aqueous phase extracted with chloroform, the combined chloroform extract washed with aqueous potassium carbonate and water, and dried with magnesium sulfate. Crystallization of the residue from a mixture of acetone and ethyl ether gave the 21-acetate of 12α-fluoro-4-pregnene-11β,21-diol-3,20-dione as a cluster of prisms. The product had a melting point of 197 to 200° C.;

$\lambda_{Max.}^{CH_3OH}$ 241; E% 408; $\lambda_{Max.}^{Nujol}$ 3.02, 5.70, 5.78, 6.06, 6.15

EXAMPLE 7

12α-Fluoro-4-Pregnene-11β,21-Diol-3,20-Dione

Treatment of the 21-acetate of 12α-fluoro-4-pregnene-11β,21-diol-3,20-dione in methanol under nitrogen with 1.1 molar equivalents of methanolic sodium methoxide for twenty-five minutes at 25° C., followed by neutralization with aqueous acetic acid, extracting with chloroform and crystallization of the product from a mixture of acetone and ethyl ether gave 12α-fluoro-4-pregnene-11β,21-diol-3,20-dione. Micro melting point 189 to 192° C.

EXAMPLE 8

21-Acetate of 12α-Fluoro-4-Pregnen-21-Ol-3,11,20-Trione

A one gram sample of the 21-acetate of 12α-fluoro-4-pregnene-11β,21-diol-3,20-dione was mixed with 15 ml. of acetic acid and 400 mg. of chromic oxide in 0.2 ml. of water, and 20 ml. of acetic acid were added at 20° C. After one hour, during which time the temperature was maintained at 20° C., the mixture was concentrated in vacuum to a small volume of water, and chloroform was then added, the chloroform extract washed with potassium bicarbonate solution, water and dried with magnesium sulfate. Removal of the solvent and crystallization from the mixture of acetone and petroleum ether gave the 21-acetate of 12α-fluoro-4-pregnen-21-ol-3,11,20-trione.

EXAMPLE 9

12α-Fluoro-4-Pregnen-21-Ol-3,11,20-Trione

Treatment of the product of Example 8 in methanol under nitrogen with 1.1 molar equivalents of methanolic sodium methoxide for 25 minutes at 25° C. followed by neutralization with aqueous acetic acid, extraction with chloroform, and crystallization of the product from a mixture of acetone and ethyl ether gives 12α-fluoro-4-pregnen-21-ol-3,11,20-trione.

EXAMPLE 10

Acylates of 12α-Fluoro-4-Pregnene-11β,21-Diol-3,20-Dione and 12α-Fluoro-4-Pregnen-21-Ol-3,11,20 Trione Trione The 12α-fluoro pregnenes produced in accordance with the procedures of Examples 7 and 9 are acylated at the 21-position by treating the 21-hydroxy compound with a carboxylic acid anhydride and pyridine at approximately room temperature. The products formed are indicated in the following table:

| Steroid | Acylating Agent | Product |
|---|---|---|
| 12α-fluoro-4-pregnene-11β-21-diol-3,20-dione. | t-Butylacetyl chloride. | 12α-fluoro-4-pregnene-11β,21-diol-3,20-dione 21-t-butyl acetate. |
| Do | β,β-Dimethyl glutaric acid anhydride. | 12α-fluoro-4-pregnene-11β,21-diol-3,20-dione 21-β,β-dimethyl-hemi-glutarate. |
| Do | Benzoyl chloride | 12α-fluoro-4-pregnene-11β,21-diol-3,20-dione 21-benzoate. |
| 12α-fluoro-4-pregnene-21-ol-3,11,20-trione. | Propionic acid anhydride. | 21 propionate of 12α-fluoro-4-pregnen-21-ol-3,11,20-trione. |
| Do | Cyclopentyl-propionyl chloride. | 21-cyclopentyl propionate of 12α-fluoro-4-pregnen-21-ol-3,11,20-trione. |
| Do | Phenyl acetyl chloride. | 21-phenylacetate of 12α-fluoro-4-pregnen-21-ol-3,11,20-trione. |

When the reaction is complete the solution is neutralized, extracted with chloroform and the chloroform extract is concentrated to dryness in vacuo to yield the product. The product is further purified by crystallization from a mixture of acetone-petroleum ether.

EXAMPLE 11

0.25% Topical Ointment of 12α-Fluoro-4-Pregnene-11β,21-Diol-3,20-Dione 21-Acetate

| | Gm. |
|---|---|
| 12α-fluoro-4-pregnene-11β,21-diol-3,20-dione 21-acetate | 0.0025 |
| Zinc stearate | 0.0855 |
| Propylene glycol | 0.3070 |
| Carbowax 1500 | 0.3800 |
| Carbowax 4000 | 0.1800 |
| Distilled water | 0.0450 |
| | 1.0000 |

Melt the carbowaxes and with stirring add the propylene glycol, zinc stearate, the steroid and water. Then pass the resulting ointment through a roller mill using cold rollers until the ointment is smooth. The resulting ointment is especially suited for dermatologic use.

An 0.5% ointment is prepared by increasing the amount of steroid and proportionately decreasing the amount of zinc stearate in the ointment. Other suitable ointments can be prepared by substituting one of the other active 12α-halo steroids described in the preceding examples for the active component in this ointment.

Any departure from the above description which conforms to the present invention is intended to be included within the scope of the claims.

What is claimed is:

1. A compound of the structural formula

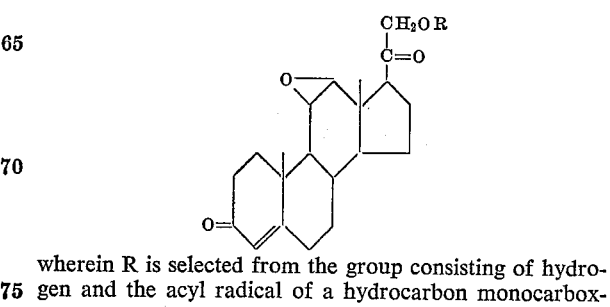

wherein R is selected from the group consisting of hydrogen and the acyl radical of a hydrocarbon monocarboxylic acid having from one to seven carbon atoms, inclusive.

2. 11β,12β-oxido-4-pregnen-21-ol-3,20-dione.

3. 21-acylate of 11β,12β-oxido-4-pregnen-21-ol-3,20-dione wherein the acyl group has the formula

and R″ is a hydrocarbon group containing less than eleven carbon atoms.

4. 21-acetate of 11β,12β-oxido-4-pregnen-21-ol-3,20-dione.

References Cited in the file of this patent
UNITED STATES PATENTS

| | | |
|---|---|---|
| 2,554,882 | Reichstein | May 29, 1951 |
| 2,769,823 | Schneider et al. | Nov. 6, 1956 |
| 2,782,211 | Wettstein et al. | Feb. 19, 1957 |